Figure 1:
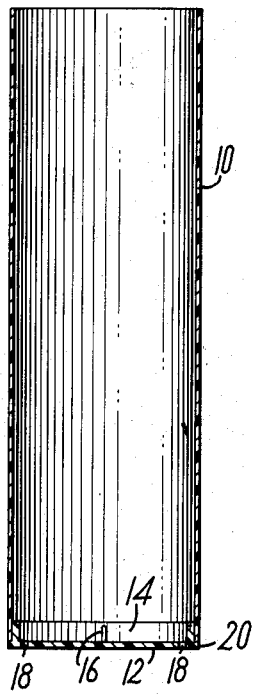

March 24, 1964   A. NICHOLS   3,126,441
HOUSING FOR ELECTRICAL CAPACITOR
Filed June 30, 1960

INVENTOR.
ANTHONY NICHOLS
BY
Eyre, Mann & Lucas
ATTORNEYS.

United States Patent Office 3,126,441
Patented Mar. 24, 1964

3,126,441
HOUSING FOR ELECTRICAL CAPACITOR
Anthony Nichols, North Leominster, Mass., assignor to Celluplastic Corporation, a corporation of New Jersey
Filed June 30, 1960, Ser. No. 39,894
4 Claims. (Cl. 174—52)

This invention relates to a plastic housing for electrical capacitors and to a method of locking the capacitors in such housing.

The capacitors with which this invention is concerned comprise cylindrical steel-jacketed bodies which are inserted into horizontal slots in banks of many thousands in dial telephone relay stations. The capacitors must be covered with insulation to prevent arcing and short circuiting because the steel jackets conduct electricity and very often the banks into which the capacitors are inserted are also made of conductive material. However, since the voltage applied to the capacitors is not very high the insulation need not have strong dielectric characteristics.

The housing of this invention comprises an extruded plastic tube closed at one end and made from plastic material having such resilient characteristics that when the tube is stretched or similarly distorted and then released it will tend to resume its original shape. As a result of such resiliency it is possible to lock the capacitor in the plastic housing simply by forcing the capacitor down into the open end of the housing. The capacitor has an annular collar adjacent its upper rim and the diameter of the inside wall of the housing is selected to be less than the outside diameter of the collar. When the capacitor is forced down into the housing the collar stretches the rim of the housing. At the same time the rim attempts to return to its original shape and as the length of the housing is slightly greater than the length of the capacitor, by the time the capacitor is seated flush against the closed end of the housing, the rim of the housing will have curled in over the rim at the top of the capacitor and thereby locked it in place in the housing. The effectiveness of this lock is quite substantial and as a practical matter it is virtually impossible to remove the capacitor from the housing without cutting open the wall of the housing.

One end of the plastic tube is closed with a plug in the form of a disc having an upright cylindrical skirt. The outside diameter of the skirt is approximately the same or slightly greater than the diameter of the inside wall of the tube so that the skirt can be frictionally fitted into the open end of the tube. The plug is permanently mounted in the tube by cementing the two parts together with conventional adhesives used in the art for this purpose. Preferably the disc portion of the plug is pierced to provide one or more vents so that the air within the housing can adjust to changes in pressure and volume caused by the heat generated in the capacitor. If desired a plurality of ribs can be positioned around the inside wall of the cylindrical skirt which will frictionally engage the lower portion of the wall of the capacitor and thereby hold and center the capacitor within the housing. However, the ribs are not necessary.

As to materials, any plastic material which has the resiliency characteristics described hereinabove may be employed for the extruded tube portion of the housing. Excellent results have been achieved with plastic materials derived from cellulose esters such as cellulose nitrate, cellulose acetate, cellulose propionate, cellulose butyrate and mixed cellulose esters such as cellulose acetate propionate, cellulose acetate butyrate and cellulose propionate butyrate. Other plastic materials which may be employed include polyolefins such as polyethylene, polypropylene, vinyl resins and polystyrene resins.

The dimensions of the tube will, of course, depend on the size of the electrical capacitor. As stated hereinabove the inside diameter should be less than outside diameter of the collar of the capacitor. The length of the tube must be greater than the length of the capacitor so that the upper rim of the tube will be able to curl in over the rim of the capacitor. The curled portion of the rim of the tube can be made as long as desired for the required locking effect.

Although the housing has been described in connection with a particular kind of capacitor it will be obvious that the housing may be employed for insulating other electrical components which have a collar of some kind associated therewith for stretching the housing. For example, resistors, inductors and other electrical components may be encased in the housing. Also the transverse cross sectional area of the electrical component may be rectangular, polygonal, elliptical or irregular instead of circular as in the capacitor which has been described.

Figure 3:
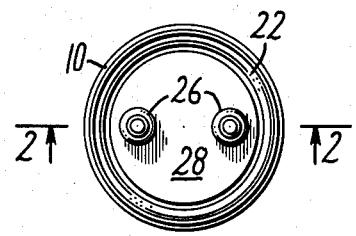
Figure 2:
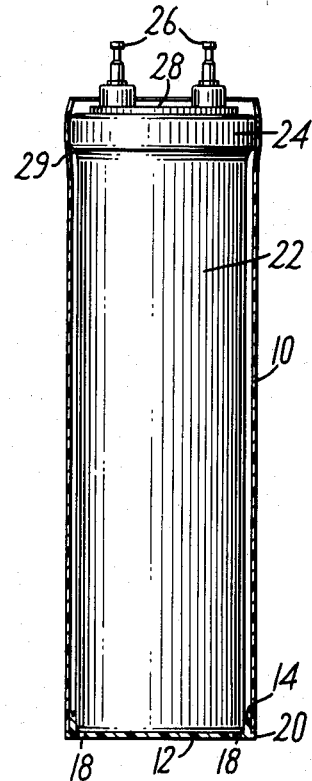
Figure 4:
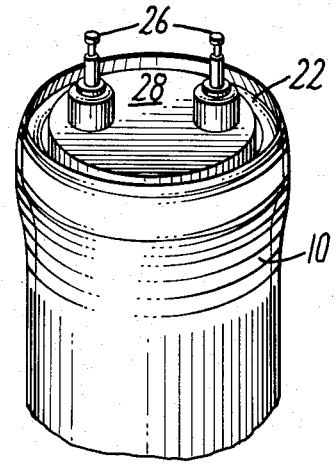

Further details of the invention will be readily understood by reference to the accompanying drawings of which:

FIG. 1 is a cross sectional view of the housing.
FIG. 2 is a similar view showing a capacitor locked in place within the housing.
FIG. 3 is a top view of the assembly of FIG. 2.
FIG. 4 is a perspective view of the upper portion of the housing-capacitor assembly of FIG. 2.

The housing shown in the drawings comprises a cylindrical plastic tube 10 closed at one end with the plug 12. The plug is in the form of a disc having an upright cylindrical skirt 14. Ribs 16 are positioned along the inside wall of the skirt in annular spaced relationship. The diameter of the skirt is such that the outside wall of the skirt makes a snug fit with the inside wall of the tube 10. The skirt is permanently attached to the wall of the tube with cement.

The disc portion of the plug 12 is pierced to provide vents 18. The side wall 20 of the disc portion extends radially out beyond the outside wall of the cylindrical skirt 14 a distance substantially equal to the wall thickness of the tube 10 thereby forming a horizontal seat for the bottom rim of the tube. After the plug is inserted into the tube the outer surfaces of the side wall of the disc and of the wall of the tube are substantially matched so that the entire housing has one continuous outer wall surface from top to bottom.

FIG. 2 shows a cylindrical capacitor 22 locked within the housing. The capacitor has an annular collar 24 positioned at the top and the outside diameter of the collar 24 is greater than the inside diameter of the tube 10 as shown in FIG. 1. A plate 28 is positioned on the top surface of the capacitor which is also provided with the usual terminals 26. The main body of the capacitor below the collar 24 has an outside diameter less than the inside diameter of the tube so that the body can be freely inserted into the tube. The upper rim of the tube will contact the lower portion of the collar and the capacitor must be pressed downwardly with considerable pressure to force it all the way down against the closed end of the tube. In the preferred form of structure shown, the bottom shoulder of the collar is tapered as at 29 and the taper acts as a cam to assist in stretching the tube so it will ride up over the exterior surface of the collar. As the capacitor is pressed downwardly the annular collar stretches the wall of the tube and then as the top of the collar moves down below the rim at the mouth of the tube the top portion of the wall of the tube above the collar tends to resume its original shape and in so doing the top portion of the wall of the tube curls in over the rim at the top of the capacitor to lock it in place in the tube. The wall of the tube actually overlies the rim at the top of the capacitor. A portion of the wall of the tube engages the exterior surface of the annular collar while the rest of the tube wall below the collar is spaced away from the wall of the capacitor. This is of advantage since the dielectric characteristics of the air in the space between the capacitor and the plastic tube add to the insulation provided by the housing itself. However, as mentioned hereinabove, high insulation is not required for the capacitor so that the air space is not actually necessary.

It will be noted in FIG. 2 that the ribs 16 of the cylindrical skirt 14 frictionally engage and grip the cylindrical wall of the capacitor near its lower end. This centers the capacitor in the lower portion of the housing and prevents it from wobbling back and forth. Also, the vents 18 allow air to flow in and out of the housing so that changes in air pressure and volume within the housing caused by heat generated by the capacitor will be automatically accommodated.

It will be understood that it is intended to cover all changes and modifications of the preferred embodiment of the invention herein chosen for the purpose of illustration which do not depart from the spirit and scope of the invention.

What is claimed is:

1. An electrical capacitor-plastic housing assembly which comprises a cylindrical capacitor having an annular collar adjacent one end and leads extending from such end, a resilient plastic tube having one closed end, the inside diameter of the tube being greater than the outside diameter of the body of the capacitor to provide an insulating air space between the body of the capacitor and body of the tube, said tube being in contact with the said collar, and the inside diameter of the tube in that area where it contacts the collar being greater than the inside diameter of the remainder of the tube, said tube being long enough to have a portion adjacent the open mouth thereof which extends beyond the top of the said collar, said portion of the wall at the top of the tube being curled inwardly to overlie the rim at the top of the capacitor to lock the capacitor in place in the housing.

2. A structure as specified in claim 1 in which the surface of the bottom shoulder of the annular collar is tapered to provide a cam surface which assists in stretching the rim of the tube when the collar is pressed down into the open end of the tube.

3. A structure as specified in claim 1 in which the closed end of the tube is closed with a plug which comprises a disc shaped bottom member having a cylindrical skirt, the outside wall surface of the skirt frictionally engaging the inside wall of the tube, the diameter of the cylindrical skirt being less than the diameter of the bottom member to provide a seat on the bottom member for the rim of the tube, the engaged surfaces of the plastic bottom member and tube being permanently joined by means of cement.

4. A structure as specified in claim 3 in which the disc shaped bottom member is pierced to provide a plurality of open vents therein and in which a plurality of vertical ribs are positioned in spaced relationship around the inside wall of the cylindrical skirt, the ribs frictionally engaging the lower portion of the wall surface of the capacitor.

References Cited in the file of this patent

UNITED STATES PATENTS

| | | |
|---|---|---|
| 2,160,646 | Coutlee | May 30, 1939 |
| 2,190,286 | Gaut et al. | Feb. 13, 1940 |
| 2,197,193 | Pontis | Apr. 16, 1940 |
| 2,299,787 | Beal | Oct. 27, 1942 |
| 2,419,683 | Henschke | Apr. 29, 1947 |
| 2,731,056 | Anson | Jan. 17, 1956 |
| 2,794,473 | Williams | June 4, 1957 |
| 2,832,493 | Murphy | Apr. 29, 1958 |
| 2,855,581 | Freedom | Oct. 7, 1958 |
| 2,867,257 | Cart | Jan. 6, 1959 |
| 2,921,706 | Johnson | Jan 19, 1960 |
| 2,944,196 | Peck | July 5, 1960 |